United States Patent [19]

Laskaris et al.

[11] 4,123,677
[45] Oct. 31, 1978

[54] SELF-REGULATING TRANSPORT MECHANISM FOR SUPER-CONDUCTIVE ROTOR REFRIGERANT

[75] Inventors: Evangelos T. Laskaris, Schenectady; Bruce B. Gamble, Elnora; Burton D. Hatch, Ballston Lake, all of N.Y.

[73] Assignee: General Electric Company, Schenectady, N.Y.

[21] Appl. No.: 573,168

[22] Filed: Apr. 30, 1975

[51] Int. Cl.² ............................................. H02K 9/00
[52] U.S. Cl. ........................................ 310/52; 310/64
[58] Field of Search ................. 310/10, 61, 40, 52, 310/54, 64; 62/499, 505, 54, 55

[56] References Cited

U.S. PATENT DOCUMENTS

| | | | |
|---|---|---|---|
| 3,368,087 | 2/1968 | Madsen | 310/40 |
| 3,471,726 | 10/1969 | Burnier | 310/10 |
| 3,626,717 | 12/1971 | Lorch | 62/505 |
| 3,743,867 | 7/1973 | Smith | 310/52 |
| 3,781,578 | 12/1973 | Smith | 310/52 |
| 3,809,933 | 5/1974 | Sugawara | 310/40 |
| 3,816,780 | 6/1974 | Smith | 310/52 |
| 3,845,639 | 11/1974 | Smith | 310/54 |
| 3,891,875 | 6/1975 | Laskaris | 310/52 |

OTHER PUBLICATIONS

"Improved Thermal Design ... for a Super Conducting Synch. Generator;" A. Bejan; M.I.T. 1972; 12/1974.

Primary Examiner—R. Skudy
Attorney, Agent, or Firm—Nathan D. Herkamp; Joseph T. Cohen; Leo I. MaLossi

[57] ABSTRACT

Cryogenic liquid coolant for cooling the rotor of a superconducting generator is deposited on the inner surface of a rotating conduit extending within the rotor, forming an annulus of liquid surrounding a vapor core. The liquid coolant from the rotating tube is transferred to two radial tubes in the rotor and, upon emerging therefrom, splashes on the surface of a pool of coolant bathing the rotor windings. Evaporated coolant is returned from the rotor in separate streams from the driven end and the collector end, allowing cooling of the driven and collector ends to be equalized by independently controlling flow of the returning streams. The liquid coolant supply pressure determines the position of the coolant pool surface in the rotor.

13 Claims, 4 Drawing Figures

SELF-REGULATING TRANSPORT MECHANISM FOR SUPER-CONDUCTIVE ROTOR REFRIGERANT

INTRODUCTION

This invention relates to electrical machines employing superconducting rotors, and more particularly to a method and apparatus for supplying coolant at cryogenic temperatures to the rotor windings of superconductive machines at a flow rate determined by the coolant evaporation rate in the rotor.

In electrical generators having superconducting rotors, the windings are bathed in a pool of very cold liquefied gas, e.g., liquefied helium, which absorbs heat from the windings and consequently evaporates to its gaseous form. Typically the generator is paired with a turbine, and the rotor of one is connected to that of the other. The portion of the generator rotor connected to the turbine rotor is the "driven" end and the portion at the opposite end of the generator is the "undriven" or collector end of the generator rotor.

It is necessary to provide means for connecting to the rotor winding pool the device which liquefies the coolant, both to supply coolant to the winding pool and to recover evaporated coolant for reliquefication. The windings rotate, while the liquefier is stationary and external to the generator. Accordingly, the supply of liquid coolant is connected to conduits within the generator, which serve the winding pool, through a fluid transfer joint between rotating and nonrotating elements.

In a desirable helium cooling system for superconductive rotor applications, helium mass flow rates through the rotor should be independent of rotor speed, such that cooldown at low speed can be performed. The system should be capable of performing properly at different mass flow rates, and coolant flow should be controlled accurately such that the minimum required flow is supplied. For high efficiency, vapor supplied with the liquid, or released from it through any transport process, should also be used for rotor cooling, although the winding itself should always be immersed in liquid helium.

In the present invention, the liquid refrigerant or coolant, typically liquid helium, supplied to the rotor is deposited on the inner surface of a rotating conduit or tube extending axially into the rotor, forming an annulus of liquid on the tube wall with a vapor core in the center. In the rotor, the liquid coolant from the axially rotating conduit, at a pressure slightly above atmospheric, is transferred to two radial, rotating tubes. The diameter of these radial tubes is sufficiently large such that the liquid coolant flows along the tube walls while the vapor flows through the central core. Each radial tube may, if desired, include a porous metal lining surrounding the hollow central core. The flow through the radial tubes will not be in equilibrium where the liquid flows through such porous metal lining at high velocities, due to the high centrifugal field, and splashes on the winding pool surface, while the vapor is compressed as it flows through the central core of the radial tubes.

Fluid discharged from the radial tubes expands radially to the surface of the winding pool as it flows between the respective radial tube and a cylindrical, open-ended enclosure around it. As the fluid expands, its temperature is reduced to the saturation temperature of the winding pool. Secondary, free-convection loops induced in the pool by the fluid density changes occurring inside and outside the cylindrical enclosure contribute to the fluid expansion cooling process.

Briefly, in accordance with a preferred embodiment of the invention, a self-regulating transport mechanism for superconductive rotor winding coolant comprises a rotating conduit extending axially into the rotor and carrying a flow of coolant in the liquid phase at constant pressure. Radial tube means situated within the rotor and comprised of an open-ended porous wall and a hollow central core are attached to, and rotate with, the conduit, the diameter of the radial tube means being sufficiently large to accommodate flow of coolant in the liquid phase along its walls and flow of coolant in the gaseous phase through its central core. The open end of the radial tube means penetrates below the surface of a pool of coolant in the liquid phase bathing the rotor windings and centrifugally retained against the rotor wall by rotation of the rotor. Coolant passing from the axially-extending conduit, through the radial tube means into the winding pool, expands radially to the surface of the pool as it flows between the radial tube means and cylindrical, open-ended shroud means enclosing the radial tube means and rotatable therewith. Any deviation in winding pool evaporation rate from the coolant mass flow in the axially-extending conduit tends to alter the rotor winding coolant pool depth, thereby altering the pressure of coolant in the axially-extending conduit so as to cause a change in coolant mass flow in a direction to restore the rotor winding pool depth to its previous level.

In accordance with another preferred embodiment of the invention, a method for self-regulating flow of refrigerant to a superconductive rotor comprises the steps of supplying liquefied gas at cryogenic temperature and constant pressure through a rotating conduit along the longitudinal axis of the rotor, rotating the rotor in unison with the conduit so as to force the liquefied gas centrifugally outward from the rotor axis of rotation and thereby leave a central core of evaporated gas, dispensing the liquefied gas at cryogenic temperature into a pool of the liquefied gas bathing the rotor windings, at a level radially outward from a liquid-vapor interface of the pool, and removing evaporated gas from the central core thereof.

One object of the invention is to provide a system for maintaining a constant depth refrigerant pool for a superconductive rotor winding.

Another object is to provide a self-correcting system for altering flow of liquefied coolant to a pool thereof in which a superconductive rotor winding is immersed, so as to ensure that the liquefied coolant flow will fully replenish only liquefied coolant that is lost from the pool.

Another object is to provide a system for regulating depth of liquid refrigerant centrifugally forced against the wall of a rotating container and evaporating at a varying rate.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
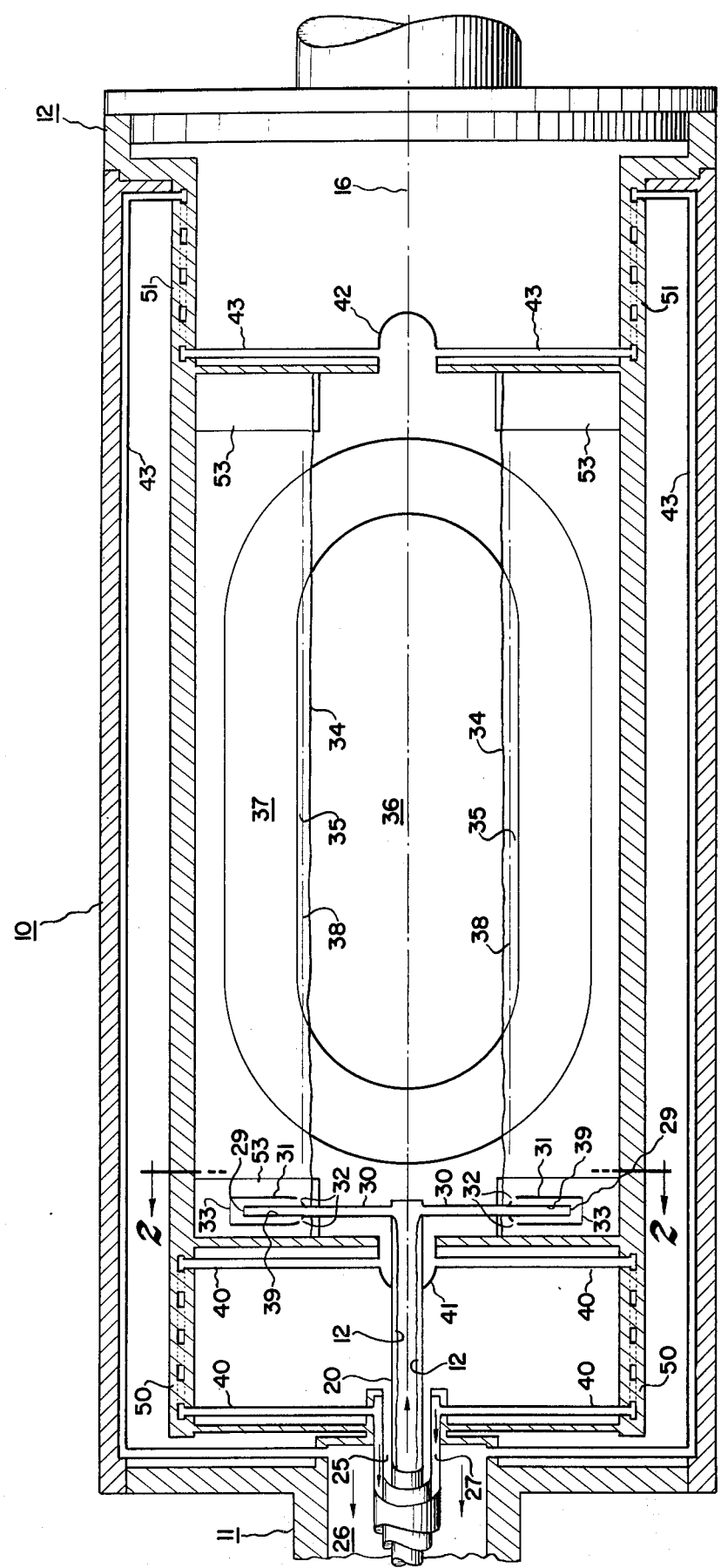
FIG. 1 is a schematic, partly sectional, longitudinal view of a superconductive A.C. generator rotor.

In FIG. 1, a superconductive rotor 10 for an A.C. machine, such as a generator, includes a driven end 12 and a nondriven or collector end 11. Cryogenic refrigerant in the form of liquefied coolant, typically helium at 4.2° K., is supplied to the collector end of the rotor through a conduit 20 from a transfer joint (not shown) in a manner such as described and claimed in Hatch application Ser. No. 573,170 or Laskaris application Ser. No. 573,169, both of which are filed concurrently herewith and assigned to the instant assignee. Since conduit 20 rotates axially about longitudinal axis 16 in unison with rotor 10, the coolant in conduit 20 separates centrifugally into a vapor phase core surrounded by a liquid phase film, producing a vapor-liquid interface 12.

Conduit 20 is terminated at refrigerant dispensing means comprising a pair of open-ended hollow radial tubes 30, each of which is surrounded by a cylindrical enclosure 31 affixed, at its innermost location 32, to a respective metal tube 30, and having its outermost end 33 open and extending beyond the radial tubes. Each of tubes 30 is of sufficiently large inside diameter to permit coolant in the liquid phase to flow in droplets along the tube wall while coolant in the vapor phase flows through the tube central core. Flow through the radial tubes is thus not in equilibrium since the liquid phase passes through the tubes at high velocities due to the high centrifugal field, while the vapor therein is compressed due to the centrifugal field. If deemed necessary, a porous metal lining 39 may be inserted in each of the radial tubes to limit the velocity rise of coolant in the liquid phase flowing through the radial tubes. Coolant in the liquid phase emerging from the radial tubes splashes on a surface 29 of a pool 35 of coolant in the liquid phase contained in rotor 10. Pool 35 is separated centrifugally from a central core 36 of coolant in the vapor phase due to rotation of the rotor. That is, the greater density of the liquefied coolant in comparison to the gaseous coolant results in liquefied coolant 35 being thrust outward from rotor axis of rotation 16, leaving a central core 36 of evaporated gas. Rotor windings 37 are immersed in pool 35.

Coolant in the vapor phase in rotor 10 is returned from the collector end through a hub 41 in gaseous communication with central core 36 of coolant in the vapor phase. The gaseous coolant flows from hub 41 through tubing 40 into a conduit 27 which conducts the coolant to the transfer joint (not shown) from whence it is discharged for reliquefication. Similarly, coolant in the vapor phase is returned from the driven end of rotor 10 through a hub 42 in gaseous communication with central core 36 of coolant in the vapor phase, the gaseous coolant flowing from hub 42 through tubing 43 into a conduit 26 which conducts the coolant to the transfer joint (not shown) from whence it is discharged for reliquefication. Tubing 40 and 43 may be patterned through the rotor wall in an arrangement to provide high heat absorption capacity at either end of the rotor and thereby help reduce the quantity of liquefied coolant necessary to be supplied to the rotor. For example, tubing 40 in region 50 and tubing 43 in region 51, which regions exist beyond the axial extent of rotor winding pool 35 and are denominated thermal distance extensions, are spiraled to provide coolant channels for counterflow cooling of the thermal distance extensions to thermally isolate the winding pool from the ends of the rotor. The arrows shown in the conduits at collector end 11 of the rotor illustrate the conduit flow directions. No continuous flow occurs through annulus 25 between conduits 20 and 27 inasmuch as annulus 25 is a vacuum jacket terminated at a sealed end (not shown), such as a bellows, located in the transfer joint (not shown). A typical termination of this type is illustrated in the aforementioned Laskaris application Ser. No. 573,169.

Coolant discharged from radial tubes 30 expands radially to the surface of winding pool 35 as it flows through the annulus between each of radial tubes 30 and the respective, surrounding, cylindrical open-ended enclosure 31. As the coolant expands, its temperature is reduced to the saturation temperature of winding pool 35. Secondary, free-convection loops, induced from the bottom (or radially-outermost portion) of the pool to pool surface 34 by fluid density changes inside and outside cylindrical enclosures 31, contribute to the fluid expansion cooling process.

To control coolant mass flow rate through the rotor, the liquid helium is supplied at constant pressure slightly above atmospheric, e.g., 17 p.s.i. absolute through apparatus described and claimed in the aforementioned Laskaris or Hatch applications. If the evaporation rate of winding pool 35 exceeds the helium mass flow rate, the resulting reduction in winding pool depth causes a corresponding reduction in coolant discharge pressure from radial tubes 30 and a simultaneous vapor pressure reduction in central conduit 20. If, during this time, the liquid helium supply pressure is kept constant, the pressure reduction in the rotor increases the helium mass flow rate through conduit 20 to maintain substantially constant the depth of winding pool 35. Conversely, if the winding pool evaporation rate is exceeded by the helium mass flow rate, the resulting increase in winding pool depth causes an increase in vapor pressure in axial supply tube 20, thereby reducing the coolant mass flow rate through the rotor until the depth of the winding pool is restored. Thus the direct relationship between the position of winding pool surface 34 and the pressure in axial supply tube 20 provides an accurate and convenient determinant for self-regulating the helium mass flow rate through the rotor. This method of control ensures that rotor winding 37 is always immersed in liquid helium, even when heat load, evaporation rate, or rotor speed varies during transient conditions.

Figure 3:
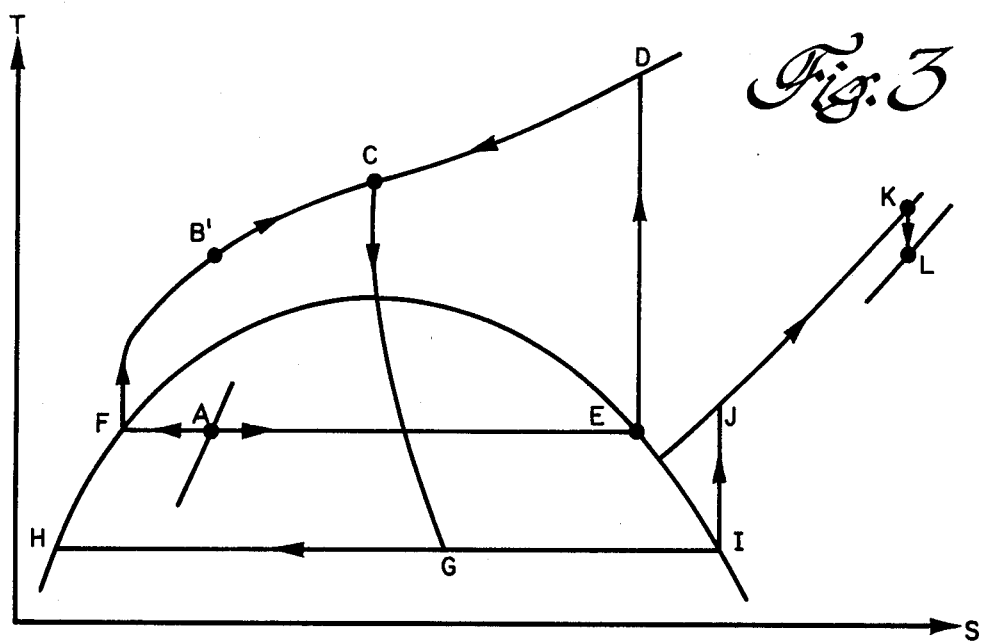
FIG. 3 is an ideal thermodynamic cycle of the cooling process for a superconductive A.C. generator rotor.

FIG. 3 is a temperature vs. entropy plot to illustrate the thermodynamic cycle of the rotor cooling process occurring at various locations in the apparatus of FIG. 1. Thus coolant is supplied to the rotor (at point A) with a vapor quality of approximately 10 percent. In conduit 20, the vapor separates from the liquid (at point E) and is compressed adiabatically through the central core of radial tubes 30 (from point E to D) while the liquid coolant (at point F) in conduit 20 undergoes an adiabatic compression (point F to B) as it flows through tubes 30 and splashes on liquid-vapor interface 29 at the outlet of the tubes (point B to B'). Mixing of the liquid coolant (at point B') with the coolant vapor (at point D)

results in coolant at point C emerging from radial tubes 30.

The coolant at point C expands radially to the surface 34 of liquid coolant pool 35 as it flows through the annular space between each of radial tubes 30 and its respective open-ended enclosure 31 (point C to point G). Vapor from pool surface 34 (at point I) is compressed adiabatically as it moves radially outward through tubing 40 and 43 (point I to point J). This vapor cools thermal distance extensions 50 and 51 in a counterflow arrangement (point J to point K) and then returns to the rotor center regions (i.e., axial conduits 27 and 26, respectively) through an adiabatic expansion (point K to point L). The vapor is then discharged close to atmospheric pressure at room temperature (point L). Since the adiabatic expansion process (point K to point L) results in a small pressure drop, it is assumed that the pressure at point J is nearly equal to the pressure at point K, and that both pressures are approximately atmospheric.

Figure 2:
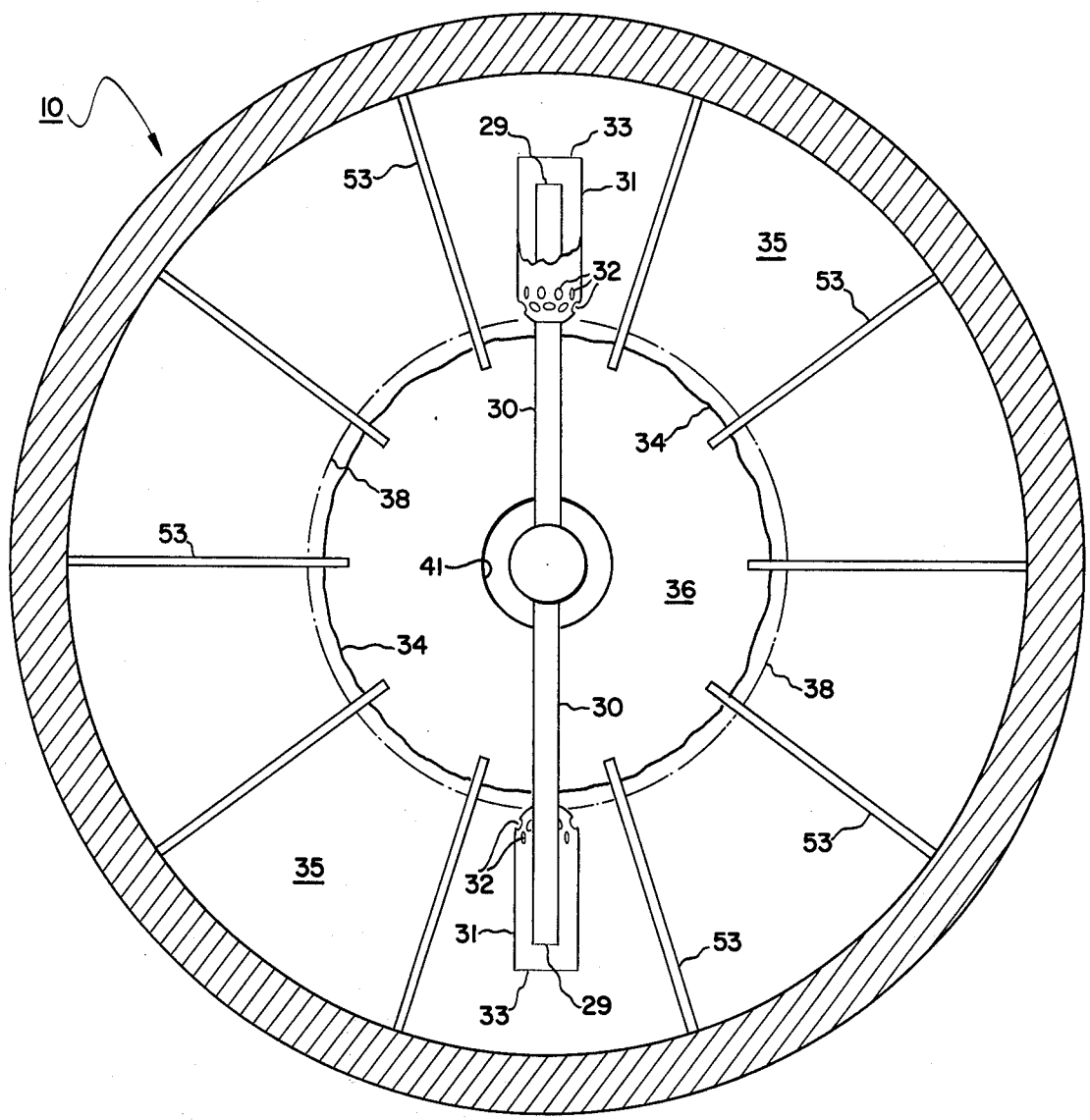
FIG. 2 is a view taken along line 2—2' of FIG. 1.

Rotor 10 typically rotates at speeds sufficiently high to maintain pressure in winding pool 35, at a depth 38 just below or radially outward of the coolant liquid-vapor interface 34, sufficiently great (by exerting a centrifugal force equal, for example, to 3000 times the force of gravity) as to prevent substantial boiling of the liquid coolant radially outward thereof, including the level at which openings 33 are located. It is desirable to prevent gaseous coolant emerging from openings 29 along with liquefied coolant from increasing angular velocity and spiraling along fairly long paths to the region between interface 34 and level 38 where pressure is low enough to permit boiling, since this allows the gas bubbles to serve as nucleation points for boiling off more of the liquid coolant. Accordingly, cylindrical enclosures 31 and baffles 53 are provided to ensure that the released gaseous coolant travels essentially radially inward to interface 34. This substantially reduces the time and distance that the released gaseous coolant discharged from outlets 29 travels between level 38 and interface 34. Baffles 53, as shown in FIGS. 1 and 2, and which are fixedly mounted in rotor 10 so as to rotate therewith, are disposed angularly about the rotor axis of rotation 16 and are thereby arranged circumferentially about the interior of the rotor. These baffles extend from inward of liquid-vapor interface 34 radially outward beyond openings 33 in cylinders 31 and into central gaseous core 36, providing physical barriers to spiral motion of coolant in the vicinity of tubes 31. Thus gaseous coolant passing outwardly from openings 29 reverses direction and proceeds inwardly through the annuli between each of tubes 30 and each of cylinders 31, respectively, and joins the bulk of the coolant in rotor winding pool 35 when it exits through openings 32.

Figure 4:
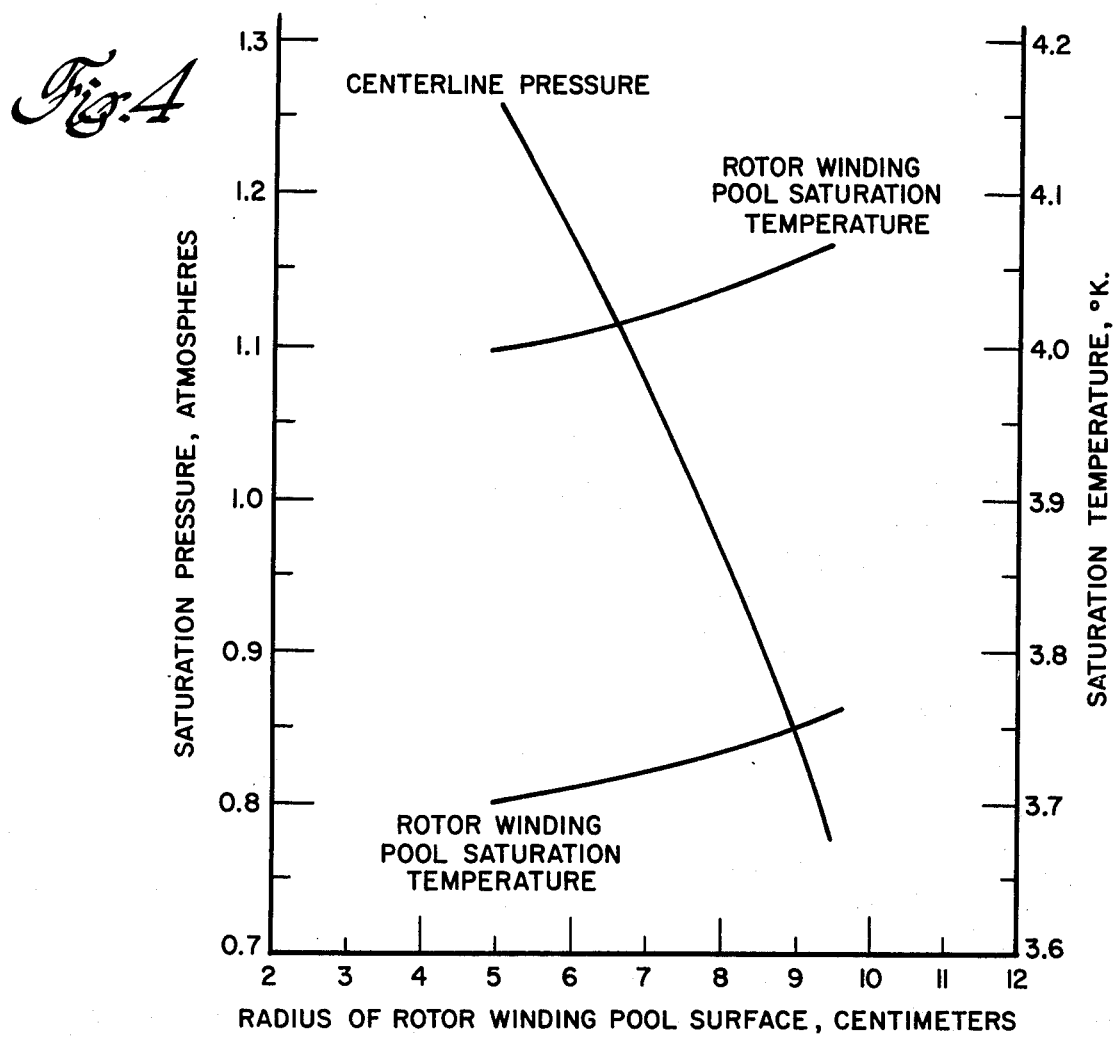
FIG. 4 is a graphical illustration of performance parameters for a typical superconductive A.C. generator rotor.

FIG. 4 illustrates representative values for a typical rotor application. The high slope of the centerline pressure curve denotes a high degree of control sensitivity with respect to the winding pool depth. Additionally, it is evident that there exists a subatmospheric pressure in the central core of the rotor. This results in saturation temperatures that are below the normal boiling point of the liquefied helium (4.2° K.); i.e., about 4.0° K. This is of particular importance since the critical current (i.e., maximum current that can be carried without loss of superconductivity) of a niobium titanium superconductive rotor winding increases by about 50 percent for each degree of temperature drop below 4.2° K.

The foregoing describes a system for maintaining a constant depth refrigerant pool for a superconductive rotor winding. The system is self-correcting for altering flow of liquefied coolant to a pool thereof in which the superconductive rotor winding is immersed so as to ensure that the liquefied coolant flow will fully replenish only liquefied coolant lost from the pool. The system also regulates depth of liquefied coolant centrifugally forced against the wall of a rotating container and evaporating at a varying rate.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What we claim as new and desire to secure by Letters Patent of the United States is:

1. A self-regulating transport mechanism for superconductive rotor winding coolant comprising:
    a rotating conduit extending axially into the interior of a rotor and carrying a flow of coolant in the liquid phase, at constant pressure;
    open-ended radial tube means within said rotor attached to, and rotatable with, said conduit, said radial tube means having an inner diameter sufficiently large to accommodate flow of coolant in the liquid phase along its inner surface and to accommodate flow of coolant in the gaseous phase through its central core, said radial tube means delivering said coolant to the interior of said rotor so as to maintain a layer of liquefied coolant of predetermined depth extending radially inward from the interior surface of said rotor and a central core of evaporated coolant in said rotor during rotation of said rotor, said radial tube means having its open end submerged in said layer of liquefied coolant; and
    tubing means in gaseous communication with said central core of evaporated coolant for conducting said evaporated coolant out of the interior of said rotor.

2. The apparatus of claim 1 including a cylindrical enclosure surrounding said radial tube means and being spaced apart therefrom so as to define an annulus therebetween, said enclosure being affixed to said radial tube means and extending radially outward beyond the open end of said radial tube means, said enclosure further being open at its ends with all openings submerged in said layer of liquefied coolant.

3. The apparatus of claim 2 including a plurality of baffles disposed circumferentially about the interior of said rotor, each baffle extending radially through said layer of liquefied coolant.

4. The apparatus of claim 3 wherein said radial tube means and said cylindrical enclosure are situated between two consecutive baffles.

5. The apparatus of claim 2 including first and second pluralities of baffles, each said plurality being disposed circumferentially about the interior of said rotor, said first plurality of baffles being situated at one end of the rotor interior and said second plurality of baffles being situated at the opposite end of the rotor interior, each baffle extending radially through said layer of liquefied coolant.

6. The apparatus of claim 5 wherein said radial tube means and said cylindrical enclosure are situated between two consecutive baffles of said first plurality of baffles.

7. The apparatus of claim 1 wherein a portion of said rotor through which said tubing means passes is configured to cool thermal distance extensions of said rotor.

8. The apparatus of claim 2 wherein said radial tube means includes a porous inner surface.

9. The apparatus of claim 4 wherein said radial tube means includes a porous inner surface.

10. A method for providing self-regulated transport of coolant to the superconductive rotor windings of an electrical generator in which said windings are bathed in a pool of cryogenically cooled, liquefied gas which removes heat from said windings and evaporates to a vapor, said method comprising:

supplying liquefied gas at cryogenic temperature and constant pressure through a rotating conduit along the longitudinal axis of said rotor;

rotating said rotor in unison with said conduit so as to force said liquefied gas centrifugally outward from the axis of rotation of said rotor and thereby leave a central core of evaporated gas;

dispensing said liquefied gas at cryogenic temperature into said pool at a level radially outward from a liquid-vapor interface of said pool; and removing said evaporated gas from said central core thereof.

11. The method of claim 10 including the step of partially confining the region of said pool where said liquefied gas is dispensed from the remainder of said pool that is circumferentially displaced therefrom.

12. The method of claim 10 including the step of circulating said evaporated gas through the wall of said rotor at either end thereof.

13. The method of claim 11 including the step of circulating said evaporated gas through the wall of said rotor at either end thereof.

* * * * *